(12) United States Patent
Krieger

(10) Patent No.: US 9,676,344 B2
(45) Date of Patent: Jun. 13, 2017

(54) FOLDING TRAVEL SUPPORT SYSTEM FOR A DEVICE

(71) Applicant: John A. Krieger, Danbury, CT (US)

(72) Inventor: John A. Krieger, Danbury, CT (US)

( * ) Notice: Subject to any disclaimer, the term of this patent is extended or adjusted under 35 U.S.C. 154(b) by 0 days.

(21) Appl. No.: 14/920,976

(22) Filed: Oct. 23, 2015

(65) Prior Publication Data

US 2016/0129850 A1   May 12, 2016

Related U.S. Application Data

(60) Provisional application No. 62/076,692, filed on Nov. 7, 2014.

(51) Int. Cl.
*B60R 11/02* (2006.01)
*B60R 11/00* (2006.01)

(52) U.S. Cl.
CPC .......... *B60R 11/02* (2013.01); *B60R 11/0258* (2013.01); *B60R 2011/0005* (2013.01); *B60R 2011/0082* (2013.01)

(58) Field of Classification Search
CPC . B60R 11/02; B60R 11/0241; B60R 11/0258; B60R 2011/0082; B60R 2011/0005; H04M 1/04
USPC ............... 248/459, 451, 454, 456, 447, 460; 211/50; 206/45.2, 45.25; 40/754
See application file for complete search history.

(56) References Cited

U.S. PATENT DOCUMENTS

| | | | | |
|---|---|---|---|---|
| 2,003,244 A | * | 5/1935 | Carboni | .................... G09F 1/06 211/73 |
| 2,097,553 A | * | 11/1937 | Gruenberg | .............. A47F 5/112 211/135 |
| 2,165,255 A | * | 7/1939 | Hamilton | ............ A47B 23/043 248/455 |
| 2,251,605 A | * | 8/1941 | Williamson | ............ A47F 5/112 248/450 |
| 2,726,835 A | * | 12/1955 | Hummel | ................. A47F 5/112 211/73 |
| 2,755,582 A | * | 7/1956 | Nichols | .................. B42D 5/045 40/121 |

(Continued)

FOREIGN PATENT DOCUMENTS

GB   2486648 A   6/2012
KR   1272750 B1   6/2013

(Continued)

OTHER PUBLICATIONS

Machine translation of KR1272750B1 published Jun. 10, 2013 to Innoworks Co.

(Continued)

*Primary Examiner* — Muhammad Ijaz
(74) *Attorney, Agent, or Firm* — Millen, White, Zelano & Branigan, P.C.; William Nixon

(57) ABSTRACT

A folding device support system allows a device, such as a phone, GPS device and the like, to be held upright. A foldable support member contains a series of hinge sections configured so as to create a pocket into which the device to be held is contained. It is foldable to allow the unit, when not in use, to be deployed essentially flat for easy storage or transportation between vehicles or locations, and is optionally fitted with a flexible base to provide stability.

14 Claims, 4 Drawing Sheets

(56) References Cited

U.S. PATENT DOCUMENTS

| | | | |
|---|---|---|---|
| 3,494,479 A * | 2/1970 | Martin | A47F 5/112 |
| | | | 211/126.16 |
| 4,817,905 A * | 4/1989 | Rondone | A47F 5/112 |
| | | | 248/174 |
| 4,819,792 A * | 4/1989 | Christian | B65D 5/5206 |
| | | | 206/45.25 |
| 5,106,047 A * | 4/1992 | Baer | A47B 63/00 |
| | | | 211/49.1 |
| 5,660,365 A * | 8/1997 | Glick | A47F 5/10 |
| | | | 248/174 |
| 6,193,546 B1 * | 2/2001 | Sadler | A45F 5/02 |
| | | | 439/165 |
| 6,673,409 B1 * | 1/2004 | Wheatley | B60R 7/02 |
| | | | 296/97.3 |
| D501,513 S * | 2/2005 | Linyear | D19/88 |
| 7,260,907 B2 * | 8/2007 | Sturba | A45C 11/18 |
| | | | 206/45.26 |
| 7,527,235 B2 * | 5/2009 | Hummel | A47F 7/142 |
| | | | 248/300 |
| 7,623,958 B1 * | 11/2009 | Laverick | B60R 11/0258 |
| | | | 361/679.01 |
| 7,780,126 B2 | 8/2010 | Law et al. | |
| D626,964 S | 11/2010 | Richardson et al. | |
| D639,816 S | 6/2011 | Bau | |
| 8,100,376 B2 | 1/2012 | Ye | |
| 8,424,830 B2 | 4/2013 | Yang | |
| D714,301 S | 9/2014 | Fujioka | |
| D714,312 S | 9/2014 | Fujioka | |
| D720,010 S | 12/2014 | Waldron | |
| 8,950,720 B1 | 2/2015 | Carr | |
| D730,091 S | 5/2015 | Chan | |
| 9,211,001 B2 * | 12/2015 | Negretti | A47B 23/04 |
| 2004/0188588 A1 * | 9/2004 | Smith | A47B 23/044 |
| | | | 248/459 |
| 2010/0090085 A1 * | 4/2010 | Corrion | A47B 23/043 |
| | | | 248/459 |
| 2010/0213331 A1 | 8/2010 | Liou | |
| 2011/0259789 A1 * | 10/2011 | Fan | B60R 11/0258 |
| | | | 206/701 |
| 2012/0074271 A1 | 3/2012 | Goetz | |
| 2012/0248277 A1 | 10/2012 | Yang et al. | |
| 2012/0261304 A1 * | 10/2012 | Busri | A45C 11/00 |
| | | | 206/736 |
| 2012/0312953 A1 | 12/2012 | Moffa | |
| 2013/0026329 A1 | 1/2013 | Lane | |
| 2013/0036635 A1 | 2/2013 | Mayer et al. | |
| 2013/0067671 A1 | 3/2013 | Lee | |
| 2013/0165188 A1 * | 6/2013 | Carney | H04M 1/0202 |
| | | | 455/575.1 |
| 2013/0256497 A1 | 10/2013 | Radmard | |
| 2014/0345074 A1 | 11/2014 | Lee | |

FOREIGN PATENT DOCUMENTS

| | | |
|---|---|---|
| KR | 470742 Y1 | 1/2014 |
| KR | 472787 Y1 | 5/2014 |

OTHER PUBLICATIONS

Machine translation of KR472787Y1 published May 23, 2014 to Ilim Sung Hoon, KR.

Machine translation of KR470742Y1 published Jan. 16, 2014 to Lee Seung Hyun (Cobusiness.com).

* cited by examiner

FOLDING TRAVEL SUPPORT SYSTEM FOR A DEVICE

BACKGROUND OF THE INVENTION

Field of the Invention

The present invention relates to folding travel support system and method for using the same. More particularly, the invention provides for the support of an electronic device, such as a cell phone or a GPS unit, to be supported on a dashboard or other surface, and has the property of being able to be folded substantially flat for storage or transport in a brief case, or jacket pocket when not in use. Further, it can adapt stability to curved surfaces, such as are found on dashboards, and remain upright during normal driving maneuvers.

Description of the Related Art

Cell phones and built-for-purpose GPS computers have been used in moving vehicles for many years. A small industry has developed that is devoted to providing drivers with a mechanism to mount these devices into various surfaces or other elements of the vehicle so that the screen is easily visible to the driver. These have all involved mechanisms that are too bulky to easily fit into a jacket pocket or a briefcase, when not in use. This feature of folding essentially flat is important to people who regularly require the item to be moved from vehicle to vehicle, or who wish to mount the phone in alternate locations, such as nightstands for use as an alarm clock, or on a desk for use as a speaker phone.

U.S. Pat. No. 8,692,659 is typical. It features a large mechanism that hangs the phone assembly from the windshield mirror.

U.S. Pat. No. 6,439,530 contains a flexible member provided by a bag of small balls, which prevents the unit from packing substantially flat. In addition, the item requires a complex mechanism to be attached to both the assembly of bags and the phone.

U.S. Pat. No. 7,407,143 shows a clamping mechanism that is attached fixed to an element that must be installed on the car.

Chinese patent, KR470742(Y1) can be manufactured from a single sheet of material, and folded into a stand but provides no side supports, nor any mechanism to prevent the stand from sliding on its supporting surface, so that when cornering or accelerating or stopping in a vehicle the phone would be thrown from the stand. Chinese patents KR472787(Y1) and KR1272750(B1) suffer from similar limitations as does British patent GB248664.

The summarized art does not provide the combination of lateral and axial stability required for normal maneuvering in a vehicle, with the ability to fold substantially flat when not in use that would be required to be practical for a traveler, or requires modifications or attachments to the vehicle or other surface on which the device may be deployed.

SUMMARY OF THE INVENTION

Cell phones and built-for-purpose GPS computers have been used in moving vehicles for many years. A small industry has developed that is devoted to providing drivers with a mechanism to mount these devices into various surfaces or other elements of the vehicle so that the screen is easily visible to the driver. These have all involved mechanisms that are too bulky to easily fit into a jacket pocket or a briefcase, when not in use. This feature of folding essentially flat is important to people who regularly require the item to be moved from vehicle to vehicle, or who wish to mount the phone in alternate locations, such as nightstands for use as an alarm clock, or on a desk for use as a speaker phone.

Many companies are in the business of providing stands or easels for this purpose. In many cases, these are either large, bulky assemblies with complex mechanisms to grip the phone and large bases to clamp onto dashboards, windshields or automobile air vents. In instances where they are light and easily folded, they do not provide sufficient stability to hold the phone securely while driving.

In response, it is now recognized that there is a need to construct a system that both remains rigid and stable when in use, securely retains the phone during the accelerations, turns, and decelerations of driving, and folds up flat for convenient carrying between cars, or to allow the phone to be used for other purposes. The disclosed embodiments address this currently unmet need. The folding device support system may be used for traveling such that the device is held upright in a variety of locations. Some locations may be in an automobile, truck, boat and the like. Other locations may be on a table or night stand, and good for use in a motel or hotel room as a clock or display. Those skilled in the art will appreciate that the disclosed folding device support system may be carried by a user and deployed as needed.

A folding device support system is disclosed. The folding device support system includes a substantially flat base. The folding device support system also includes an articulated member cut from the base. The articulated member includes two corner supports and two connecting sections foldably separable from a back portion of the articulated member. The folding device support system also includes a plurality of slits in the articulated member to allow separation of the two corner supports and the two connecting sections when separated from a back portion of the articulated member.

Another folding device support system is disclosed. The folding device support system includes a substantially flat base. The folding device support system also includes an articulated member attached fixedly to the base. The articulated member includes two corner supports and two connecting sections. The folding device support system also includes hinges in the articulated member to allow the two corner supports and the two connecting sections to be configured separately from the body of the articulated member.

Another folding device support system is disclosed. The folding device support system includes a substantially flat base. The folding device support system also includes an articulated member attached fixedly to the base. The articulated member includes at least one corner support and at least one connecting section foldably separable from a back portion of the articulated member. The folding device support system also includes a plurality of slits in the articulated member to allow separation of the at least one corner support and the at least one connecting section when separated from a back portion of the articulated member. The folding device support system also includes at least one supporting member attached fixedly to the base and configured to mate with the articulated member using a tab.

Another folding device support system is disclosed. The folding device support system includes a substantially flat base portion. The folding device support system also includes an articulated member cut from the base portion. The folding device support system also includes slits in the articulated member allowing for a configuration of two corner supports and two connecting sections to be folded separately from a back portion of the articulated member.

Another folding device support system is disclosed. The folding device support system includes a substantially flat base portion. The folding device support system also includes an articulated member attached fixedly to the base portion. The folding device support system also includes slits in the articulated member allowing for a configuration of two corner supports and two connecting sections to be folded separately from a body of the articulated member.

Another folding device support system is disclosed. The folding device support system includes a substantially flat base. The folding device support system also includes an articulated member attached fixedly to the base. The folding device support system also includes slits in the articulated member allowing for a configuration of two corner supports and two connecting sections to be folded separately from a body of the articulated member. The folding device support system also includes supporting members attached fixedly to the based and configured to mate with the articulated member.

Another folding device support system for a device is disclosed. The folding device support system includes a base. The folding device support system also includes an articulated member attached to the base. The articulated member includes a back portion that is rotatable away from the base. The articulated member also includes corner supports and connecting sections that extend outwardly from the hack portion such that the articulated member is configured to secure a device with the back portion, the corner supports and the connecting sections.

Another folding device support system is disclosed. The folding device support system includes abuse. The folding device support system also includes an articulated member configured to hold a device using corner supports and connecting members that extend outwardly when a back portion of the articulated member is rotated.

Another folding device support system is disclosed. The folding device support system includes a substantially flat base. The folding device support system also includes an articulated member attached fixedly to the base. The folding device support system also includes slits in the articulated member allowing for two corner supports and two connecting sections to be configured separately from the body of the articulated member.

The folding device support system also includes supporting members attached fixedly to the base and configured to mate with the articulated member. The folding device support system also includes a flexible mounting pad attached fixedly to the base.

Another folding device support system is disclosed. The folding device support system includes a substantially flat base. The folding device support system also includes an articulated member attached fixedly to the base. The folding device support system also includes slits in the articulated member allowing for two corner supports and two connecting sections to be configured separately from the body of the articulated member. The folding device support system also includes a flexible mounting pad attached fixedly to the base.

DETAILED DESCRIPTION OF THE PREFERRED EMBODIMENTS

Figure 1:
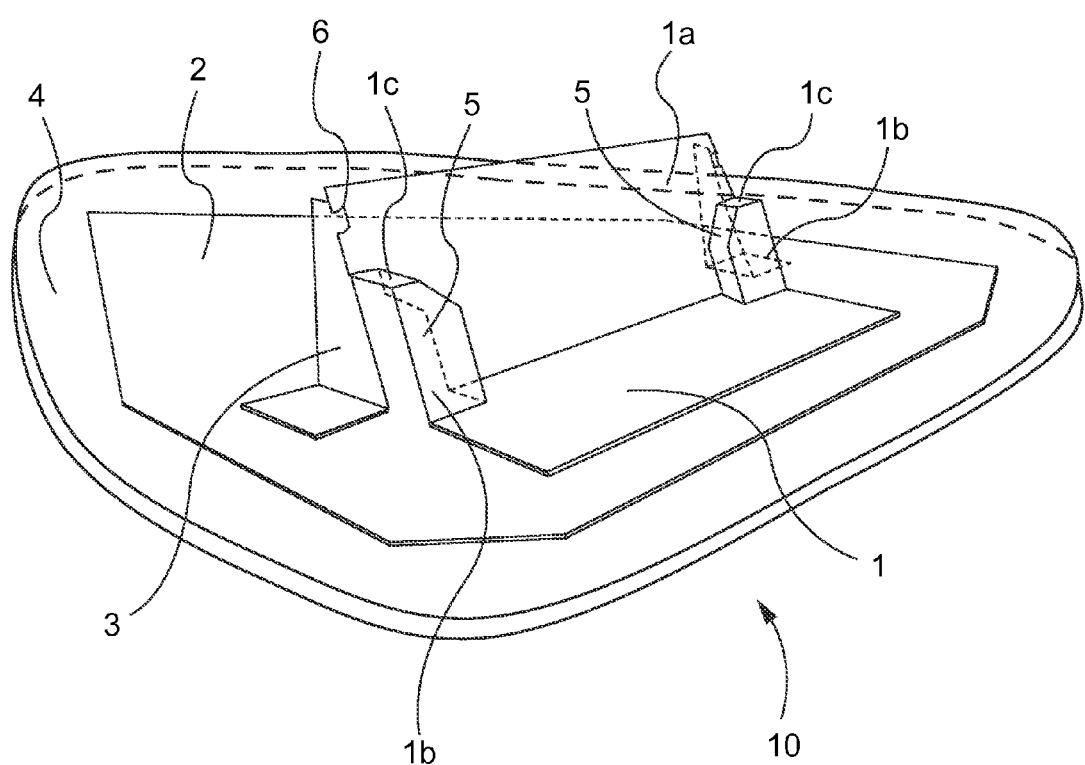
FIG. 1 illustrates a front perspective view of the system engaging a support system and supporting a container according to the disclosed embodiments.

Reference will now be made in detail to embodiments of the invention. Wherever possible, same or similar reference numerals are used in the drawings and the description to refer to the same or like parts or steps. The drawings are in simplified form and are not to precise scale. For purposes of convenience and clarity only, directional (up/down, etc.) or motional (forward/back, etc.) terms may be used with respect to the drawings. These and similar directional terms should not be construed to limit the scope of the invention in any manner.

Figure 2:
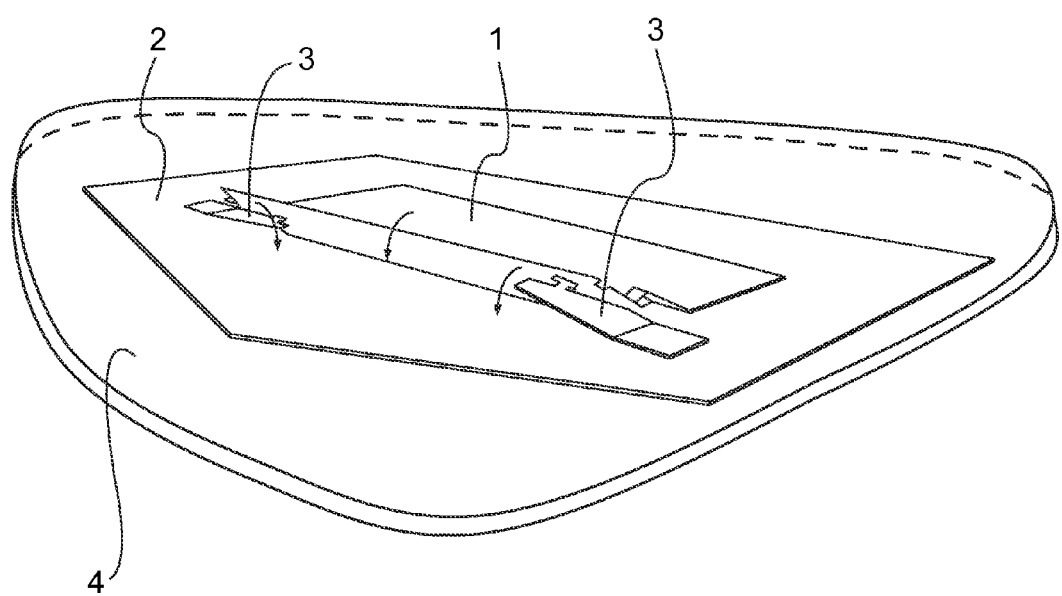
FIG. 2 illustrates a rear perspective showing the motion of the articulated member and the supporting members as they are being folded flat for storage or transport.

Referring now to FIGS. 1 and 2, where related embodiments of the proposed system are operative of a number of functionally hingably secured panels and elements according to the following description. The figures show a system 10 that is able to provide stability to a device. A user may be able to view a display on the device in a more consistent manner using system 10.

Figure 4:
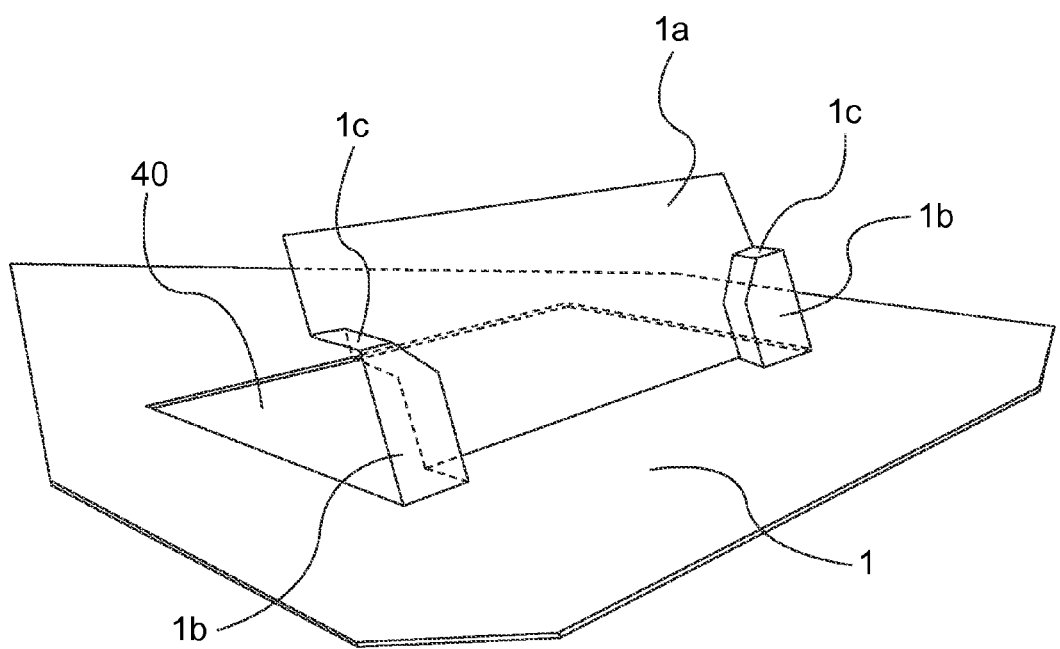
FIG. 4 illustrates an alternate embodiment of the invention wherein the articulated member is formed integral to the base according to the disclosed embodiments.

An articulated member is shown as part 1. This member may be attached to a separate base, shown here as part 2, or it may be integral to the base, as shown in FIG. 4. Base 2 may be substantially flat in that it may have most of its bottom or top surface within a plane. This plane may be parallel to a surface to place system 10. The term "substantially" is used herein as base 2 may not be completely flat. This feature allows base 2 to fit within a variety of flexible mounting pads, shown as 4 in FIG. 1.

The articulated member 1 is slitted and foldable so that when the back portion 1a is raised, the lower left and lower right corners 1b fold up in front of the back portion in such a way as to provide a space 5 into which a suitable shaped cell phone, GPS unit, or other item to be displayed can be inserted. The item is constrained in its side-to-side motion by the connecting portions 1c of the articulated member 1, which is deployed by that same folding motion.

Back portion 1a also may be substantially straight to provide support when enclosing a device. Back portion 1a, preferably, is not perpendicular to base 2, but at an angle to base 2 such that the held device tilts backwards. Some embodiments, however, may have back portion 1a be perpendicular to base 2.

The system 10 will hold the device, such as a cell phone, GPS, and the like or any other item to be displayed, substantially upright. To provide additional stability, in an alternative embodiment, two supporting members 3, are shown which may be deployed. These supporting members 3 are shown with tabs 6 that fit into slots on the articulated member 1. Obviously, there are a number of ways the supporting members 3 may be affixed to the articulated member 1, and the invention is intended to include these variants as well.

The system 10 as described above, with or without the supporting members 3, can be used to display the device on a stationary flat surface, such as a nightstand, a stereo table, or any other surface on which a cell phone may be used. Where the system 10 is to be deployed on an irregular or curved surface, or where it is to be subjected to lateral forces as may be incurred in a moving car, an additional piece, a flexible mounting pad 4, may be affixed at one or more points to the base 2, or to the integral base and articulated member 1. Pad 4 is flexible so that it may conform to the irregular or curved surface on with the unit is placed, and is composed of a material with a high-friction surface, so that it will adhere to the curved or irregular surface when the lateral forced incurred during acceleration, deceleration or turning of a motor vehicle are imposed.

Figure 3:
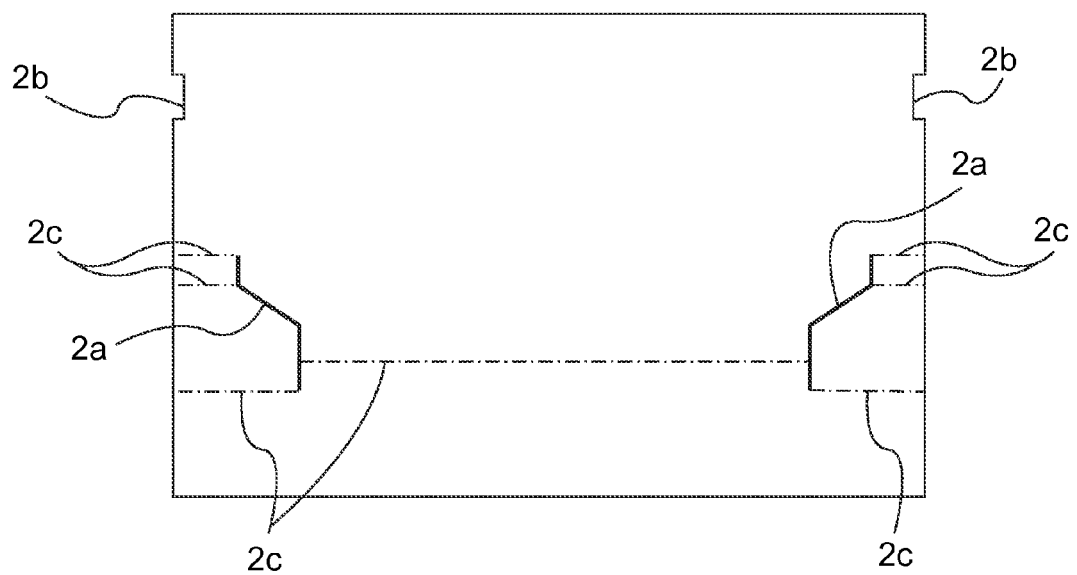
FIG. 3 illustrates a drawing of the articulated member, shown in its flat position, and showing the slits that allow it to be folded in such a way that when folded it creates a space into which the phone may be securely placed.

Referring to FIG. 3, articulated member 1 is shown as a single piece of material suitable for the above-disclosed functionality. Articulated member 1 includes slits 2a to allow separation of corner supports 1b and connecting sections 1c to create the slot(s) to receive the device. Articulated member 1 also includes slots 2b to couple or attach with supporting members 3. Hinge lines 2c are located in the vicinity of slits 2a, and allow the functionality of bending articulated member 1 so that articulated back 1a is detachable from base 2. This feature also allows movability of articulated member 1 into the desired configuration.

FIG. 4 depicts another embodiment of system 10. Articulated member 1 is shown with an integrated base along with articulated back 1a, corner supports 1b, and connecting sections 1c. This unitary construction eliminates the need for additional materials or assembly during production. Articulated back 1a moves about a hinge line to elevate away from the surface below member 1. In some embodiments, an aperture 40 may be created within member 1. Aperture 40 may be used to further secure system 10 from moving.

Articulated member 1 may be comprised of a stiff material, such as cardboard. Member 1 also may have a thickness that allows it to be stored in a pocket without bulging. Preferably, articulated member 1 has a thickness of about 8 sheets of paper. This thickness allows for proper stability and support for the device by system 10. Once the device is placed within system 10, the support and tension to hold the device in place prevents articulated member 1 from collapsing.

DRAWING ELEMENTS REFERENCE LIST

1—Articulated member
1a—Articulated back
1b—Corner support
1c—Connecting section
2—Separate base
2a—Slits
2b—Slots
2c—Hinge lines
3—Supporting members
4—Flexible mounting pad
5—Space
6—Tabs
10—System
40—Aperture Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A folding device support system comprising:
a substantially flat base;
an articulated member cut from the base, wherein the articulated member includes two corner supports and two connecting sections foldably separable from a back portion of the articulated member; and
a plurality of slits in the articulated member to allow separation of the two corner supports and the two connecting sections when separated from the back portion of the articulated member,
wherein each of the connecting sections includes a first hinge line connected with the base and a second hinge line connected with the respective corner supports, and
wherein each of the corner supports includes a third hinge line connected with the base, such that, when in a folded configuration, the two corner supports move relative to the third hinge lines to be substantially perpendicular with the base.

2. The folding device support system of claim 1, further comprising: a plurality of supporting members attached fixedly to the base and configured to mate with the articulated member.

3. The folding device support system of claim 1, wherein the back portion is rotatable away from the base, and the corner supports and the connecting sections extend outwardly from the back portion such that the articulated member is configured to secure a device with the back portion, the corner supports and the connecting sections.

4. The folding device support system of claim 1, further comprising a mounting pad to support the base and the articulated member.

5. The folding device support system of claim 1, further comprising an aperture within the base to receive the articulated member when folded flat.

6. The folding device support system of claim 1, wherein the articulated member is integrated into the base.

7. A folding device support system comprising:
a substantially flat base;
an articulated member attached fixedly to the base, wherein the articulated member includes two corner supports and two connecting sections; and
a first set of hinges in the articulated member to connect the two corner supports and the two connecting sections and a second set of hinges to connect the two corner supports and the two connecting sections, such that the first set of hinges and the second set of hinges allow the two corner supports and the two connecting sections to be configured separately from the body of the articulated member,
a third set of hinges to connect the two corner supports and the base such that when in a folded configuration of the two corner supports and the two connecting sections being separated from the a body of the articulated member,
the two corner supports move relative to the base to be substantially perpendicular with the base.

8. The folding device support system of claim 7, further comprising:
a plurality of supporting members attached fixedly to the base and configured to mate with the articulated member.

9. The folding device support system of claim 8, wherein the supporting members include tabs to mate with the articulated member.

10. The folding device support system of claim 7, further comprising a flexible mounting pad attached fixedly to the base.

11. The folding device support system of claim 7, wherein a back portion is rotatable away from the base, and the corner supports and the connecting sections extend outwardly from the back portion such that the articulated member is configured to secure a device with the back portion, the corner supports and the connecting sections.

12. The folding device support system of claim 7, further comprising an aperture within the base to receive the articulated member when folded flat.

13. A folding device support system comprising:
a substantially flat base;
an articulated member cut from the base, wherein the articulated member includes two corner supports and two connecting sections foldably separable from a back portion of the articulated member; a plurality of slits in the articulated member to avow separation of the two corner supports and the two connecting sections when separated from the back portion of the articulated member, wherein each of the connecting sections includes a first hinge line connected with the base and a second hinge line connected with the respective corner supports,
wherein each corner support includes a third hinge line connected with the base, such that, when in a folded configuration, the two corner supports move relative to the third hinge lines to be substantially perpendicular with the base; and at least one supporting member fixedly attached to the base and configured to mate with the articulated member using a tab.

14. The folding device support system of claim 13, wherein the back portion is rotatable away from the base, and the two corner supports and the two connecting sections extend outwardly from the back portion such that the articulated member is configured to secure a device with the back portion, the two corner supports and the two connecting sections.

* * * * *